United States Patent
Yoon et al.

(10) Patent No.: US 9,187,375 B2
(45) Date of Patent: Nov. 17, 2015

(54) DIELECTRIC CERAMIC COMPOSITION AND MULTILAYER CERAMIC CAPACITOR CONTAINING THE SAME

(71) Applicant: SAMSUNG ELECTRO-MECHANICS CO., LTD., Suwon-Si, Gyeonggi-Do (KR)

(72) Inventors: Seok Hyun Yoon, Suwon-Si (KR); Jae Sung Park, Suwon-Si (KR); Soo Kyong Jo, Suwon-Si (KR); Doo Young Kim, Suwon-Si (KR); Chang Hoon Kim, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/463,203

(22) Filed: Aug. 19, 2014

(65) Prior Publication Data

US 2015/0299047 A1  Oct. 22, 2015

(30) Foreign Application Priority Data

Apr. 18, 2014  (KR) .................. 10-2014-0046550

(51) Int. Cl.
    C04B 35/468    (2006.01)
    H01G 4/06      (2006.01)
    H01G 4/12      (2006.01)
    H01G 4/30      (2006.01)

(52) U.S. Cl.
    CPC .......... *C04B 35/468* (2013.01); *C04B 35/4682* (2013.01); *H01G 4/1227* (2013.01); *H01G 4/30* (2013.01)

(58) Field of Classification Search
    CPC .... C04B 35/475; C04B 35/4682; H01G 4/10; H01G 4/12
    See application file for complete search history.

(56) References Cited

U.S. PATENT DOCUMENTS

| | | |
|---|---|---|
| 2008/0253060 A1 | 10/2008 | Ito et al. |
| 2010/0231096 A1* | 9/2010 | Saito et al. .................. 310/365 |
| 2013/0020525 A1* | 1/2013 | Saito et al. ............. 252/62.9 PZ |
| 2013/0056671 A1* | 3/2013 | Kubota et al. .......... 252/62.9 PZ |
| 2013/0270965 A1* | 10/2013 | Hayashi et al. ............... 310/328 |

FOREIGN PATENT DOCUMENTS

| | | |
|---|---|---|
| CN | 101531510 | * 9/2009 |
| JP | 2568567 B2 | 1/1997 |
| JP | 2006-111468 A | 4/2006 |
| JP | 2007-153710 A | 6/2007 |
| JP | 2011173776 A | 9/2011 |
| KR | 1999-0075846 A | 10/1999 |
| KR | 10-2005-0047872 A | 5/2005 |
| KR | 2007-0026399 A | 3/2007 |

OTHER PUBLICATIONS

Korean Office Action issued in Korean Application No. 10-2014-0046550, dated Mar. 9, 2015, with English translation.

* cited by examiner

*Primary Examiner* — Karl Group
(74) *Attorney, Agent, or Firm* — McDermott Will & Emery LLP

(57) ABSTRACT

A dielectric ceramic composition may include a base powder represented by $(1-a)[(1-x)BaTiO_3-xBi(Mg_{0.5}Ti_{0.5})O_3]+a[(1-y)BaTiO_3-yBi(Mg_{0.5}Ti_{0.5})O_3]$ (wherein x, y, and a satisfy $0 \le x \le 0.05$, $0.05 \le y \le 0.5$, $a \ge 0$, and $0.01-x \le a \le 1-y$) and formed by mixing a first powder represented by $[(1-x)BaTiO_3-xBi(Mg_{0.5}Ti_{0.5})O_3]$ with a second powder represented by $[(1-y)BaTiO_3-yBi(Mg_{0.5}Ti_{0.5})O_3]$. Each of the first powder and the second powder contains a first main component represented by $BaTiO_3$ and a second main component represented by $Bi(Mg_{0.5}Ti_{0.5})O_3$, but at different ratios.

10 Claims, 2 Drawing Sheets

A − A'

DIELECTRIC CERAMIC COMPOSITION AND MULTILAYER CERAMIC CAPACITOR CONTAINING THE SAME

CROSS-REFERENCE TO RELATED APPLICATION

This application claims the benefit of Korean Patent Application No. 10-2014-0046550 filed on Apr. 18, 2014, with the Korean Intellectual Property Office, the disclosure of which is incorporated herein by reference.

BACKGROUND

The present disclosure relates to a novel dielectric ceramic composition having guaranteed X8R temperature characteristics and reliability, and a multilayer ceramic capacitor containing the same.

Generally, electronic components using ceramic materials, such as capacitors, inductors, piezoelectric elements, varistors, thermistors, and the like, include a ceramic body formed of a ceramic material, internal electrodes formed in the ceramic body, and external electrodes formed on surfaces of the ceramic body to be connected to the internal electrodes.

Among ceramic electronic components, a multilayer ceramic capacitor includes a plurality of stacked dielectric layers, internal electrodes disposed to face each other with the dielectric layers interposed therebetween, and external electrodes electrically connected to the internal electrodes.

Multilayer ceramic capacitors have been widely used as components for mobile communications devices such as computers, personal digital assistances (PDAs), mobile phones, and the like, due to advantages thereof such as a small size, high capacitance, easiness of mounting, and the like.

A multilayer ceramic capacitor may be generally manufactured by forming dielectric layers and internal electrodes using a paste for an internal electrode and a paste for a dielectric layer by a sheet forming method, a printing method, and the like, stacking the dielectric layers and then performing a co-sintering process.

Dielectric materials used in existing high capacitance multilayer ceramic capacitors, and the like, are ferroelectric materials based on barium titanate ($BaTiO_3$) and have high dielectric constants at room temperature, a relatively small dissipation factor, and excellent insulation resistance.

However, the dielectric materials based on barium titanate ($BaTiO_3$) have limitations in satisfying X8R characteristics, capacitance temperature characteristics ranging up to a temperature of 150° C., and ensuring reliability.

Therefore, a material satisfying X8R characteristics, capacitance temperature characteristics ranging up to a temperature of 150° C. and ensuring reliability is required.

RELATED ART DOCUMENT (Patent Document 1) Korean Patent Laid-Open Publication No. 1999-0075846

SUMMARY

An exemplary embodiments in the present disclosure may provide a novel dielectric ceramic composition having guaranteed X8R temperature characteristics and reliability, and a multilayer ceramic capacitor containing the same.

According to an exemplary embodiments in the present disclosure, a dielectric ceramic composition may include: a base powder represented by $(1-a)[(1-x)BaTiO_3-xBi(Mg_{0.5}Ti_{0.5})O_3]+a[(1-y)BaTiO_3-yBi(Mg_{0.5}Ti_{0.5})O_3]$ (wherein x, y, and a satisfy $0 \leq x \leq 0.05$, $0.05 \leq y \leq 0.5$, $a \geq 0$, and $0.01-x \leq a \leq 1-y$) formed by mixing a first powder represented by $[(1-x)BaTiO_3-xBi(Mg_{0.5}Ti_{0.5})O_3]$ with a second powder represented by $[(1-y)BaTiO_3-yBi(Mg_{0.5}Ti_{0.5})O_3]$, each of the first powder and the second powder containing a first main component represented by $BaTiO_3$ and a second main component represented by $Bi(Mg_{0.5}Ti_{0.5})O_3$, but at different ratios.

According to an exemplary embodiments in the present disclosure, a multilayer ceramic capacitor may include: a ceramic body in which dielectric layers and first and second internal electrodes are alternately stacked; and first and second external electrodes formed on both end portions of the ceramic body and electrically connected to the first and second internal electrodes, respectively, wherein the dielectric layers contain a dielectric ceramic composition containing a base powder represented by $(1-a)[(1-x)BaTiO_3-xBi(Mg_{0.5}Ti_{0.5})O_3]+a[(1-y)BaTiO_3-yBi(Mg_{0.5}Ti_{0.5})O_3]$ (wherein x, y, and a satisfy $0 \leq x \leq 0.05$, $0.05 \leq y \leq 0.5$, $a \geq 0$, and $0.01-x \geq a \geq 1-y$) formed by mixing a first powder represented by $[(1-x)BaTiO_3-xBi(Mg_{0.5}Ti_{0.5})O_3]$ with a second powder represented by $[(1-y)BaTiO_3-yBi(Mg_{0.5}Ti_{0.5})O_3]$, each of the first powder and the second powder containing a first main component represented by $BaTiO_3$ and a second main component represented by $Bi(Mg_{0.5}Ti_{0.5})O_3$, but at different ratios.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
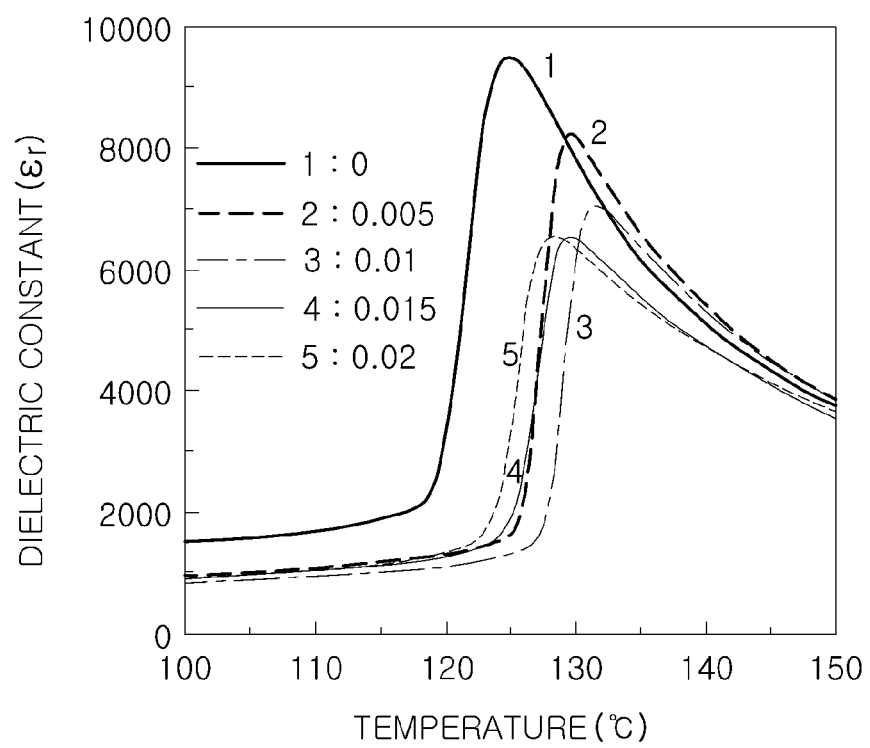
FIG. 1 is a graph illustrating a change in a dielectric constant ($\in_r$) with respect to a temperature of a base powder sintered body represented by $(1-x)BaTiO_3-xBiMO_3$ (where M includes Mg and Ti) containing a first main component represented by $BaTiO_3$ and a second main component represented by $BiMO_3$.

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure is directed to a dielectric ceramic composition, and examples of electronic components containing the dielectric ceramic composition may include a capacitor, an inductor, a piezoelectric element, a varistor, a thermistor, and the like. Hereinafter, a dielectric ceramic composition and a multilayer ceramic capacitor as an example of the electronic components will be described.

The dielectric ceramic composition according to an exemplary embodiment of the present disclosure may contain a base powder represented by $(1-a)[(1-x)BaTiO_3-xBi(Mg_{0.5}Ti_{0.5})O_3]+a[(1-y)BaTiO_3-yBi(Mg_{0.5}Ti_{0.5})O_3]$ (wherein x, y, and a satisfy $0 \leq x \leq 0.05$, $0.05 \leq y \leq 0.5$, $a \geq 0$, and $0.01-x \leq a \leq 1-y$) formed by mixing a first powder represented by $[(1-x)BaTiO_3-xBi(Mg_{0.5}Ti_{0.5})O_3]$ with a second powder represented by $[(1-y)BaTiO_3-yBi(Mg_{0.5}Ti_{0.5})O_3]$, each of the first powder and the second powder containing a first main component represented by $BaTiO_3$ and a second main component represented by $Bi(Mg_{0.5}Ti_{0.5})O_3$, but at different ratios.

The dielectric ceramic composition according to an exemplary embodiment of the present disclosure may satisfy X5R (−55° C. to 85° C.), X7R (−55° C. to 125° C.), and X8R (−55° C. to 150° C.) characteristics defined by Electronic Industries Association (EIA) standard.

In detail, according to an exemplary embodiment of the present disclosure, a dielectric ceramic composition in which nickel (Ni) is used as a material of an internal electrode and is capable of being sintered under a reduction atmosphere in which nickel (Ni) is not oxidized at a temperature of 1300° C. or less, may be provided.

In addition, the present disclosure provides a multilayer ceramic capacitor using the dielectric ceramic composition, thereby satisfying the temperature characteristics and implementing excellent reliability.

Hereinafter, respective elements of the dielectric ceramic composition according to an exemplary embodiment of the present disclosure will be described in detail.

a) Base Powder

The dielectric ceramic composition according to an exemplary embodiment of the present disclosure may contain a base powder represented by $(1-a)[(1-x)BaTiO_3-xBi(Mg_{0.5}Ti_{0.5})O_3]+a[(1-y)BaTiO_3-yBi(Mg_{0.5}Ti_{0.5})O_3]$ formed by mixing a first powder represented by $[(1-x)BaTiO_3-xBi(Mg_{0.5}Ti_{0.5})O_3]$ with a second powder represented by $[(1-y)BaTiO_3-yBi(Mg_{0.5}Ti_{0.5})O_3]$, each of the first powder and the second powder containing a first main component represented by $BaTiO_3$ and a second main component represented by $Bi(Mg_{0.5}Ti_{0.5})O_3$, but at different ratios.

In the Equation above, x, y, and a may satisfy $0 \leq x \leq 0.05$, $0.05 \leq y \leq 0.5$, $a \geq 0$, and $0.01-x \leq a \leq 1-y$.

The first main component may be represented by $BaTiO_3$ and here, $BaTiO_3$, a material used as a general dielectric base powder, may be a ferroelectric material having Curie temperature of 125 degrees.

In addition, the second main component may be represented by $Bi(Mg_{0.5}Ti_{0.5})O_3$.

The $Bi(Mg_{0.5}Ti_{0.5})O_3$ may be a ferroelectric material having a relatively high Curie temperature (Tc) of 400° C. or more.

That is, the base powder of the dielectric ceramic composition according to an exemplary embodiment of the present disclosure may have a form in which a $BaTiO_3$ material having a Curie temperature of 125° C. and a ferroelectric material having a relatively high Curie temperature (Tc) of 400° C. or more are mixed with each other at a predetermined ratio.

The base powder may be prepared by mixing a paraelectric material with a ferroelectric material at a predetermined ratio as described above, such that a high room temperature dielectric constant may be implemented and insulation resistance may be excellent, in particular, X8R (−55° C. to 150° C.) temperature characteristics may be implemented.

That is, the dielectric ceramic composition according to an exemplary embodiment of the present disclosure may guarantee an operation under a high temperature environment of 150° C.

In addition, the base powder of the dielectric ceramic composition may be a solid solution, in addition to the above-described mixture in which a $BaTiO_3$ material having a Curie temperature of 125° C. and a ferroelectric material having a high Curie temperature (Tc) of 400° C. or more are mixed with each other.

In a case in which the base powder is a solid solution containing a paraelectric material and a ferroelectric material, the base powder may have a single phase form, and may have more excellent characteristics such as a dielectric constant, X8R (−55° C. to 150° C.) temperature characteristics, a temperature coefficient of capacitance (TCC), a dissipation factor (DF), and the like, as compared to those of mixtures of two materials.

The base powder may be configured by mixing a first powder with a second powder and each of the first powder and the second powder may contain a first main component represented by $BaTiO_3$ and a second main component represented by $Bi(Mg_{0.5}Ti_{0.5})O_3$, but in this case, the first main component and the second main component may be mixed with each other at different ratios. A first accessory component and a second accessory component as additives may be provided to the base powder, such that a high room temperature dielectric constant may be implemented, X8R (−55° C. to 150° C.) temperature characteristics may be excellent, and excellent TCC characteristics may be implemented.

The first powder in the base powder may be represented by $[(1-x)BaTiO_3-xBi(Mg_{0.5}Ti_{0.5})O_3]$ and here, x may satisfy $0 \leq x \leq 0.05$.

In addition, the second powder in the base powder may be represented by $[(1-y)BaTiO_3-yBi(Mg_{0.5}Ti_{0.5})O_3]$ and here, y may satisfy $0.05 \leq y \leq 0.5$.

The dielectric ceramic composition according to an exemplary embodiment of the present disclosure may contain a base powder formed by mixing the first powder with the second powder at a predetermined ratio.

Therefore, the base powder may be represented by $(1-a)[(1-x)BaTiO_3-xBi(Mg_{0.5}Ti_{0.5})O_3]+a[(1-y)BaTiO_3-yBi(Mg_{0.5}Ti_{0.5})O_3]$ and a may be adjusted to satisfy $a \geq 0$ and $0.01-x \leq a \leq 1-y$, such that a relatively high room temperature dielectric constant may be implemented, X8R (−55° C. to 150° C.) temperature characteristics may be excellent, and improved temperature coefficient of capacitance (TCC) may be realized.

That is, the base powder contains $Bi(Mg_{0.5}Ti_{0.5})O_3$ which is a ferroelectric material having a high Curie temperature (Tc) of 400° C. or more at a predetermined ratio, such that the above-described characteristics may be obtained.

In a case in which a is 0, TCC may be out of a standard range at 150° C.

In a case in which a satisfies $0.01-x \leq a \leq 1-y$, a room temperature dielectric constant may be high, X8R (−55° C. to 150° C.) temperature characteristics may be excellent, and improved temperature coefficient of capacitance (TCC) may be realized. However, in a case in which a is out of the range, the respective characteristics may be deteriorated and high temperature withstand voltage properties may be deteriorated.

That is, in a case in which a, a variable depending on x and y values, is less than $0.01-x$ or more than $1-y$, TCC characteristics may be deteriorated and high temperature withstand voltage properties may be deteriorated.

The base powder may have an average particle size of 1000 nm or less, but is limited thereto.

In general, $CaZrO_3$ and an excessive amount of rare-earth element are added to $BaTiO_3$ in order to satisfy high temperature characteristics (X8R characteristics). However, in this case, even when the high temperature characteristics may be implemented, since the Curie temperature of the base powder itself is 125° C., there may be limitations in improving temperature coefficient of capacitance (TCC).

In addition, reliability may be reduced since a pyrochlore secondary phase is produced by the addition of an excessive amount of rare-earth element.

However, the base powder of the dielectric ceramic composition according to an exemplary embodiment of the present disclosure may be in the form of a mixture or a solid solution in which a paraelectric material having a low Curie temperature is mixed with or solid-solubilized in a ferroelectric material having a high Curie temperature at a predetermined ratio and may have high temperature characteristics (X8R characteristics) and excellent temperature coefficient of capacitance (TCC) characteristics.

b) First Accessory Component

According to an exemplary embodiment of the present disclosure, the dielectric ceramic composition may further contain an oxide or a carbonate containing at least one of Mn, V, Cr, Fe, Ni, Co, Cu and Zn, as a first accessory component.

As the first accessory component, the oxide or the carbonate containing at least one of Mn, V, Cr, Fe, Ni, Co, Cu and Zn may be contained in a content of 0.1 to 5.0 mol % based on 100 mol % of the base powder.

The first accessory component may serve to decrease a sintering temperature and improve high temperature withstand voltage properties of a multilayer ceramic capacitor to which the dielectric ceramic composition is applied.

The content of the first accessory component and a content of a second accessory component to be described below, the contents contained based on 100 mol % of the base powder, respectively, may be defined by mol % of metal ions contained in respective accessory components.

In a case in which a content of the first accessory component is less than 0.1 mol %, a sintering temperature may be increased and high temperature withstand voltage properties may be slightly deteriorated.

In a case in which a content of the first accessory component is 5.0 mol % or more, high temperature withstand voltage properties and room temperature specific resistance may be deteriorated.

In particular, the dielectric ceramic composition according to an exemplary embodiment of the present disclosure may further contain the first accessory component having a content of 0.1 to 5.0 mol % based on 100 mol % of the base powder, such that a relatively low temperature sintering process may be performed and excellent high temperature withstand voltage properties may be obtained.

c) Second Accessory Component

According to an exemplary embodiment of the present disclosure, the dielectric ceramic composition may further contain an oxide containing Si or a glass compound containing Si, as a second accessory component.

The dielectric ceramic composition may further contain the second accessory component, which is an oxide containing Si or a glass compound containing Si, in a content of 0.1 to 5.0 mol % based on 100 mol % of the base powder.

As the second accessory component, the oxide containing Si or the glass compound containing Si may be contained in a content of 0.1 to 5.0 mol % based on 100 mol % of the base powder.

The second accessory component may serve to decrease a sintering temperature and improve high temperature withstand voltage characteristics of a multilayer ceramic capacitor to which the dielectric ceramic composition is applied.

In the case in which a content of the second accessory component is less than 0.1 mol % based on 100 mol % of the base powder, a sintering temperature may be increased.

In the case in which a content of the second accessory component is 5.0 mol % or more based on 100 mol % of the base powder, high temperature withstand voltage characteristics may be deteriorated.

In detail, the dielectric ceramic composition according to an exemplary embodiment of the present disclosure may further contain the second accessory component having a content of 0.1 to 5.0 mol % based on 100 mol % of the base powder, such that a relatively low temperature sintering process may be performed and excellent high temperature withstand voltage characteristics may be obtained.

FIG. 1 is a graph illustrating a change in a dielectric constant ($\in_r$) with respect to a temperature of a base powder sintered body represented by $(1-x)BaTiO_3-xBiMO_3$ (where M includes Mg and Ti) containing a first main component represented by $BaTiO_3$ and a second main component represented by $BiMO_3$.

Referring to FIG. 1, it may be appreciated that since samples 2 to 5, Inventive Examples of the present disclosure contain the dielectric ceramic composition provided as a mixture or a solid solution in which a ferroelectric material having a relatively high Curie temperature of 400° C. or more is mixed with or solid-solubilized in $BaTiO_3$ at a predetermined ratio, Curie temperature may be increased as compared to Comparative Example (Sample 1) to which $BaTiO_3$ having a Curie temperature of 125° C. is applied.

Therefore, in the case of a multilayer ceramic capacitor to which the dielectric ceramic composition according to an exemplary embodiment of the present disclosure is applied, high temperature characteristics (X8R characteristics) may be satisfied and excellent temperature coefficient of capacitance (TCC) characteristics may be implemented.

Figure 2:
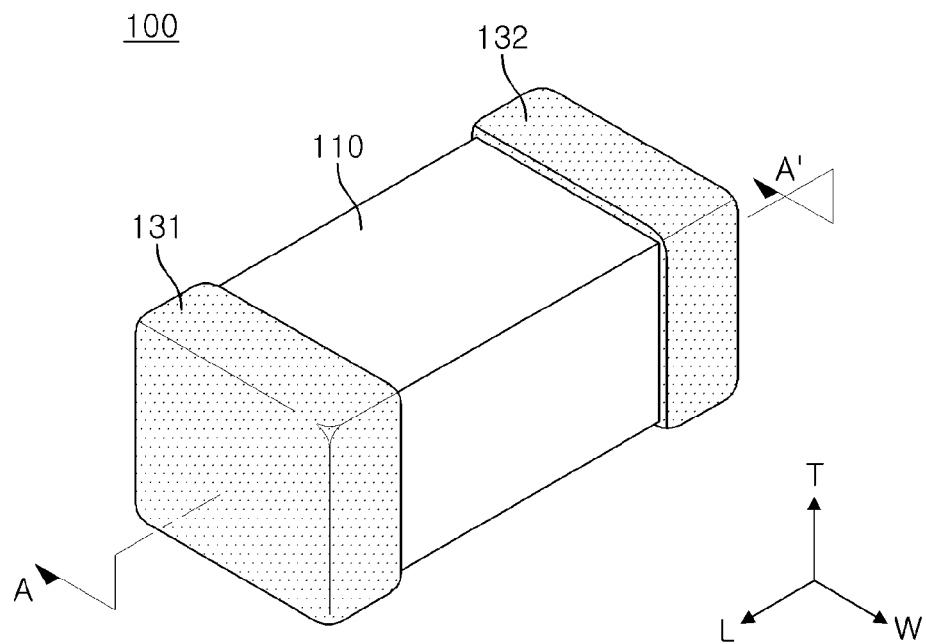
FIG. 2 is a schematic perspective view illustrating a multilayer ceramic capacitor according to an exemplary embodiment of the present disclosure.
Figure 3:
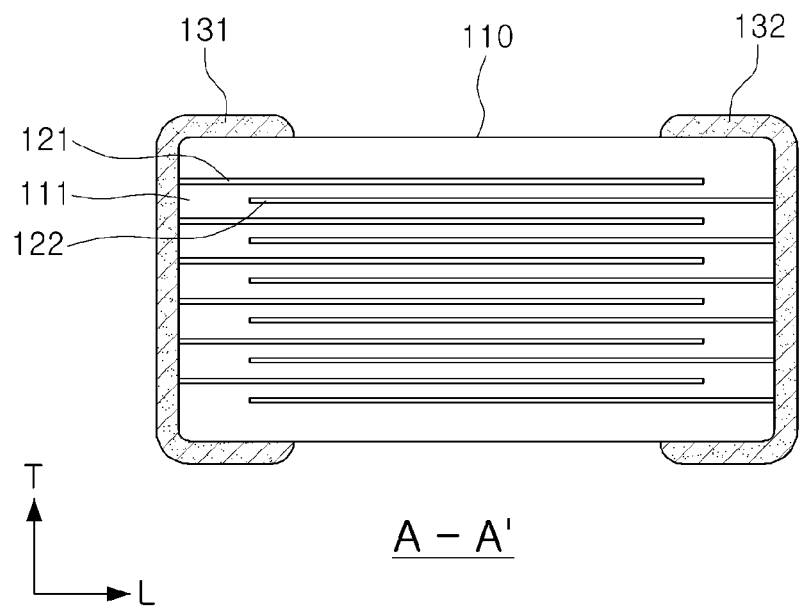
FIG. 3 is a schematic cross-sectional view illustrating the multilayer ceramic capacitor taken along line A-A' of FIG. 2.

FIG. 2 is a schematic perspective view illustrating a multilayer ceramic capacitor 100 according to an exemplary embodiment of the present disclosure, and FIG. 3 is a schematic cross-sectional view illustrating the multilayer ceramic capacitor 100 taken along line A-A' of FIG. 2.

Referring to FIGS. 2 and 3, a multilayer ceramic capacitor 100 according to an exemplary embodiment of the present disclosure may include a ceramic body 110 in which dielectric layers 111 and first and second internal electrodes 121 and 122 are alternately stacked. First and second external electrodes 131 and 132 electrically connected to the first and second internal electrodes 121 and 122 alternately disposed within the ceramic body 110, respectively, may be formed on both end portions of the ceramic body 110.

The ceramic body 110 may generally have a hexahedral shape, but is not limited thereto. In addition, the ceramic body 110 may have a proper size depending on usage thereof, for example, (0.6~5.6 mm)×(0.3~5.0 mm)×(0.3~1.9 mm), but is not limited thereto.

Further, a thickness of the dielectric layer 111 may be arbitrarily changed depending on capacitance design of a capacitor. In an exemplary embodiment of the present disclosure, the dielectric layer may have a thickness of 0.2 μm or more per 1 layer after performing a sintering process.

In a case in which the dielectric layer has an extremely thin thickness, since the number of crystal grains present in a single layer is low to cause a negative effect on reliability, the dielectric layer may have a thickness of 0.2 μm or more.

The first and second internal electrodes 121 and 122 may be stacked so that respective ends thereof are alternately exposed to opposite end surfaces of the ceramic body 110.

The first and second external electrodes 131 and 132 may be formed on both end portions of the ceramic body 110 and be electrically connected to the exposed end surface of the alternately disposed first and second internal electrodes 121 and 122, thereby configuring a circuit of a capacitor.

A conductive material contained in the first and second internal electrodes 121 and 122 is not particularly limited. However, since the dielectric layer according to an exemplary embodiment of the present disclosure contains a mixture or a solid solution in which a paraelectric material is mixed with or solid-solubilized in a ferroelectric material, nickel (Ni) may be used as the conductive material.

Each thickness of the first and second internal electrodes 121 and 122 may be appropriately determined depending on usage thereof, or the like, for example, 0.1 to 5 μm or 0.1 to 2.5 μm, but is not limited thereto.

A conductive material contained in the first and second external electrodes 131 and 132 may be nickel (Ni), copper (Cu), or an alloy thereof, but is not limited thereto.

Each thickness of the first and second external electrodes 131 and 132 may be appropriately determined depending on usage thereof, or the like, for example, 10 to 50 μm, but is not limited thereto.

The dielectric layer 111 configuring the ceramic body 110 may contain the dielectric ceramic composition according to an exemplary embodiment of the present disclosure.

The dielectric ceramic composition may contain a base powder represented by $(1-a)[(1-x)BaTiO_3-xBi(Mg_{0.5}Ti_{0.5})O_3]+a[(1-y)BaTiO_3-yBi(Mg_{0.5}Ti_{0.5})O_3]$ (wherein x, y, and a satisfy $0 \leq x \leq 0.05$, $0.05 \leq y \leq 0.5$, $a \geq 0$, and $0.01-x \leq a \leq 1-y$) formed by mixing a first powder represented by $[(1-x)BaTiO_3-xBi(Mg_{0.5}Ti_{0.5})O_3]$ with a second powder represented by $[(1-y)BaTiO_3-yBi(Mg_{0.5}Ti_{0.5})O_3]$, each of the first powder and the second powder containing a first main component represented by $BaTiO_3$ and a second main component represented by $Bi(Mg_{0.5}Ti_{0.5})O_3$, but at different ratios.

Since a detailed description of the dielectric ceramic composition is the same as the above-described features of the dielectric ceramic composition according to an exemplary embodiment of the present disclosure, the detailed description thereof will be omitted herein.

Hereinafter, although the present disclosure will be described in detail through Inventive and Comparative Examples, this description is provided to assist understanding of the present disclosure, and accordingly, a scope of the present disclosure is not limited to the following Inventive Examples.

A raw material powder contained $(1-x)BaTiO_3-xBi(Mg_{0.5}Ti_{0.5})O_3$ as a main component and was prepared by applying a solid phase method thereto as described below.

Starting raw materials, $BaCO_3$, $TiO_2$, $Bi_2O_3$, and $MgCO_3$, were dispersed in ethanol and mixed with together according to respective composition ratios shown in the following Table 1.

The mixed powder particles were subjected to calcination in a temperature range of from 950 to 1050° C. in the air atmosphere to prepare a main component powder having an average particle size of 300 nm.

The first powder and the second powder respectively having different contents of $Bi(Mg_{0.5}Ti_{0.5})O_3$, x values, in the main component base powder, were mixed at a predetermined ratio.

Then, after $MnO_2$ and $SiO_2$ powders which are accessory additives were added to the first main component powder according to the composition ratio shown in the following Table 1, the raw material powder particles containing the main component and the accessory component, ethanol/toluene, a dispersing agent, and a binder were mixed with together, using a zirconia ball as a mixing/dispersing media, followed by a ball-milling process for 20 hours, thereby preparing a slurry.

The prepared slurry was molded to be a sheet having a thickness of about 10 μm, using a small sized coater in a doctor blade scheme.

Nickel (Ni) internal electrodes were printed onto the sheet having a thickness of about 10 μm.

Upper and lower cover layers were manufactured by stacking 25 layers of molded sheets having each thickness of 10 to 13 μm and an active layer was manufactured by stacking 21 layers of sheets having each thickness of about 2.0 μm and internal electrodes printed thereon, thereby manufacturing a bar.

The compressed bar was cut into chips each having a 3216 size (length×width×thickness of 3.2 mm×1.6 mm×1.6 mm), by a cutter.

The obtained chip was plasticized and sintered under a reduction atmosphere (0.1% of $H_2$/99.9% of $N_2$, $H_2O/H_2/N_2$ atmosphere) at a temperature of 1200 to 1300° C. for 2 hours, and was then subjected to a heat treatment under a nitrogen ($N_2$) atmosphere at a temperature of 1000° C. for 3 hours, for reoxidation.

The sintered chip was subjected to a termination process with a copper (Cu) paste, followed by an electrode firing process, thereby completing external electrodes.

The completed prototype MLCC sample was evaluated in view of capacitance, DF, insulation resistance, TCC, and resistance deterioration behavior, depending on a voltage step increase at a high temperature of 150° C., or the like.

Room temperature capacitance and dielectric loss of the MLCC chip were measured under conditions of 1 kHz and 0.2 V/μm of AC, using an LCR-meter.

A dielectric constant of the MLCC chip was calculated from capacitance, a thickness of the dielectric layer of the MLCC chip, an area of the internal electrodes, and the number of stacked layers.

By taking 10 samples, room temperature insulation resistance (IR) thereof was measured after DC 10 V/μm was applied thereto for 60 seconds.

The TCC depending on temperature was measured in a temperature range from −55° C. to 150° C.

In a high temperature IR voltage-boost test, resistance deterioration behavior thereof was measured by increasing a voltage step by 5 V/μm at 150° C., and 10 minutes was required for respective steps, while resistance values were measured at 5-second intervals.

High temperature withstand voltage was deduced from the high temperature IR voltage-boost test, and the withstand voltage indicates a voltage, IR of which was resistant to a $10^5 \Omega$ or more when the resistance value was measured by applying a voltage step of 5V/μm of DC to a 3216 sized-chip having a 20-layered dielectric with a thickness of 7 μm after performing a sintering process, at 150° C., for 10 minutes, and then continuously increasing the voltage step.

The following Tables 1, 3, and 5 show compositions of Experimental Examples (Inventive Example and Comparative Example), and Tables 2, 4, and 6 show properties of prototype MLCC chips corresponding to compositions indicated by Tables 1, 3, and 5.

TABLE 1

| EXPERIMENTAL EXAMPLE | First Powder Molar Ratio of Each Component of First Powder $(1-x)BaTiO_3 + xBi(Mg_{0.5}Ti_{0.5})O_3$ | | Second Powder Molar Ratio of Each Component of Second Powder $(1-y)BaTiO_3 + yBi(Mg_{0.5}Ti_{0.5})O_3$ | | Mixing Molar Ratio of First Powder vs Second Powder $(1-a)[(1-x)BaTiO_3 + xBi(Mg_{0.5}Ti_{0.5})O_3] + a[(1-y)BaTiO_3 + yBi(Mg_{0.5}Ti_{0.5})O_3]$ | | Additive (Accessory Component) Number of Models of Additive Per 100 mol of Base Metal Powder | |
|---|---|---|---|---|---|---|---|---|
| | First Main Component $(1-x)$ | Second Main Component $x$ | First Main Component $(1-y)$ | Second Main Component $y$ | First Powder $(1-a)$ | Second Powder $a$ | First Accessory Component $MnO_2$ | Second Accessory Component $SiO_2$ |
| 1 | 1.000 | 0.000 | 0.950 | 0.050 | 1.00 | 0.00 | 0.50 | 0.50 |
| 2 | 1.000 | 0.000 | 0.050 | 0.050 | 0.90 | 0.10 | 0.50 | 0.50 |
| 3 | 1.000 | 0.000 | 0.950 | 0.050 | 0.50 | 0.50 | 0.50 | 0.50 |
| 4 | 1.000 | 0.000 | 0.950 | 0.050 | 0.05 | 0.95 | 0.50 | 0 50 |
| 5 | 1.000 | 0.000 | 0.950 | 0.050 | 0.00 | 1.00 | 0.50 | 0.50 |
| 6 | 1.000 | 0.000 | 0.800 | 0.200 | 0.90 | 0.10 | 0.50 | 0.50 |
| 7 | 1.000 | 0.000 | 0.800 | 0.200 | 0.80 | 0.20 | 0.50 | 0.50 |
| 8 | 1.000 | 0.000 | 0.800 | 0.200 | 0.50 | 0.50 | 0.50 | 0.50 |
| 9 | 1.000 | 0.000 | 0.800 | 0.200 | 0.20 | 0.80 | 0.50 | 0.50 |
| 10 | 1.000 | 0.000 | 0.800 | 0.200 | 0.05 | 0.95 | 0.50 | 0.50 |
| 11 | 1.000 | 0.000 | 0.650 | 0.350 | 0.90 | 0.10 | 0.50 | 0.50 |
| 12 | 1:000 | 0.000 | 0.650 | 0.350 | 0.50 | 0.50 | 0.50 | 0.50 |
| 13 | 1.000 | 0.000 | 0.650 | 0.350 | 0.35 | 0.65 | 0.50 | 0.50 |
| 14 | 1.000 | 0.000 | 0.650 | 0.350 | 0.20 | 0.80 | 0.50 | 0.50 |
| 15 | 1.000 | 0.000 | 0.500 | 0.500 | 0.80 | 0.10 | 0.50 | 0.50 |
| 16 | 1.000 | 0.000 | 0.500 | 0.500 | 0.50 | 0.50 | 0.50 | 0.50 |
| 17 | 1.000 | 0.000 | 0.500 | 0.500 | 0.35 | 0.65 | 0.50 | 050 |

TABLE 2

Ni-MLCC Proto-Type SPL Properties
(Dielectric Constant/DF Measurement Condition: AC 0.2 V/μm, 1 kHz)
(Room Temperature Specific Resistance: DC 10 V/μm)

| Experimental Example | Firing Temperature (° C.) | Room Temperature Dielectric Constant | DF (%) | Room Temperature Specific Resistance (ohm-cm) | TCC (%) (−55° C.) | TCC (%) (125° C.) | TCC (%) (150° C.) | High Temperature (150° C.) Withstand Voltage (V/μm)* | Evaluation |
|---|---|---|---|---|---|---|---|---|---|
| 1 | 1250.0 | 2858.0 | 3.520 | 8.221E+12 | −13.20% | −12.40% | −35.20% | 70 | X |
| 2 | 1250.0 | 2655.0 | 3.770 | 1.045E+13 | −12.80% | −11.00% | −14.90% | 75 | ○ |
| 3 | 1250.0 | 2463.0 | 4.120 | 5.642E+12 | −13.60% | −10.50% | −14.10% | 60 | ○ |
| 4 | 1250.0 | 2201.0 | 4.550 | 4.553E+12 | −14.50% | −7.88% | −13.50% | 55 | ○ |
| 5 | 1250.0 | 2155.0 | 5.740 | 3.646E+12 | −14.40% | −5.70% | −13.20% | 50 | Δ |
| 6 | 1250.0 | 2712.0 | 3.690 | 1.380E+13 | −12.50% | −10.40% | −14.50% | 70 | ○ |
| 7 | 1250.0 | 2637.0 | 4.120 | 9.450E+12 | −13.70% | −8.40% | −12.70% | 70 | ○ |
| 8 | 1250.0 | 2465.0 | 4.880 | 8.320E+12 | −14.40% | −7.70% | −11.50% | 65 | ○ |
| 9 | 1250.0 | 2477.0 | 6.240 | 5.880E+12 | −10.70% | −5.40% | −13.50% | 50 | Δ |
| 10 | 1250.0 | 2506.0 | 7.330 | 9.773E+11 | −9.50% | −6.20% | −14.20% | 40 | X |
| 11 | 1250.0 | 2634.0 | 3.880 | 8.850E+12 | −11.70% | −9.80% | −13.50% | 65 | ○ |
| 12 | 1250.0 | 2523.0 | 4.750 | 6.370E+12 | −11.40% | −8.50% | −12.30% | 60 | ○ |
| 13 | 1250.0 | 2337.0 | 6.880 | 1.060E+12 | −10.50% | −7.50% | −12.10% | 55 | ○ |
| 14 | 1250.0 | 2125.0 | 8.210 | 8.581E+11 | −8.44% | −5.80% | −11.90% | 45 | X |
| 15 | 1250.0 | 2555.0 | 4.160 | 6.580E+12 | −12.80% | −9.50% | −13.10% | 65 | ○ |
| 16 | 1250.0 | 2168.0 | 6.120 | 2.800E+11 | −13.50% | −6.40% | −10.60% | 55 | ○ |
| 17 | 1250.0 | 1875.0 | 8.690 | 8.560E+10 | −13.90% | −4.80% | −8.70% | 35 | X |

Table 1 above shows compositions of Experimental Examples (Inventive and Comparative Examples) in which a content of $Bi(Mg_{0.5}Ti_{0.5})O_3$ in the first powder, x, satisfied x=0, depending on a content of $Bi(Mg_{0.5}Ti_{0.5})O_3$ in the second powder, y, and a content of the second powder, a, when the first accessory component $MnO_2$ and the second accessory component $SiO_2$ were contained in contents of 0.5 mol % and 0.5 mol, respectively, based on 100 mol % of the base powder $(1-a)[(1-x)BaTiO_3+xBi(Mg_{0.5}Ti_{0.5})O_3]+a[(1-y)BaTiO_3+yBi(Mg_{0.5}Ti_{0.5})O_3]$. Table 2 shows properties of prototype chips corresponding to the Experimental Examples of Table 1 above.

It could be appreciated that in Comparative Example 1 in which a=0 (Experimental Example 1), TCC at 150° C. was −35.2%, which was out of the standard range, and in a case in which a was increased under the condition that the y value was fixed (Experimental Examples 1 to 17), TCC at 150° C. was increased, and a high temperature withstand voltage was decreased.

In addition, as y was increased, a value, the content of the second powder deteriorating the high temperature withstand voltage was also decreased.

That is, it could be appreciated that when the y values were 0.05 (Experimental Example 4), 0.2 (Experimental Example 9), 0.35 (Experimental Example 13) and 0.5 (Experimental Example 16), maximum values of the content of the second powder, a, at which 50 V/μm or more of high temperature withstand voltage properties could be implemented, were 0.95, 0.8, 0.65 and 0.5, respectively.

In addition, it could be appreciated that when the content of $Bi(Mg_{0.5}Ti_{0.5})O_3$ in the first powder, x, satisfied x=0, minimum value of the content of the second powder, a, at which TCC standard at 150° C. could be satisfied, was 0.01 (Experimental Example 2, and Inventive Example 2).

Referring to Tables 1 and 2 above, it could be appreciated that Experimental Examples 1, 10, 14 and 17 had problems in the evaluation of X8R(−55 C to 150° C.) temperature characteristics, temperature coefficient of capacitance (TCC) characteristics, and high temperature withstand voltage properties.

TABLE 3

| EXPERIMENTAL EXAMPLE | First Powder Molar Ratio of Each Component of First Powder $(1 - x)BaTiO_3 + xBi(Mg0.5Ti0.5)O_3$ | | Second Powder Molar Ratio of Each Component of Second Powder $(1 - y)BaTiO_3 + yBi(Mg0.5Ti0.5)O_3$ | | Mixing Molar Ratio of First Powder vs Second Powder $(1 - a)[(1 - x)BaTiO_3 + xBi(Mg0.5Ti0.5)O_3] + a([1 - y)BaTiO_3 + yBi(Mg0.5Ti0.5)O_3]$ | | Additive (Accessory Component) Number of Moles of Each Additive Per 100 mol of Base Metal Powder | |
|---|---|---|---|---|---|---|---|---|
| | First Main Component $(1 - x)$ | Second Main Component x | First Main Component $(1 - y)$ | Second Main Component y | First Powder $(1 - a)$ | Second Powder a | First Accessory Component MnO2 | Second Accessory Component SiO2 |
| 18 | 0.975 | 0.025 | 0.950 | 0.050 | 1.00 | 0.00 | 0.50 | 0.50 |
| 19 | 0.975 | 0.025 | 0.950 | 0.050 | 0.90 | 0.10 | 0.50 | 0.50 |
| 20 | 0.975 | 0.025 | 0.950 | 0.050 | 0.50 | 0.50 | 0.50 | 0.50 |
| 21 | 0.975 | 0.025 | 0.950 | 0.050 | 0.05 | 0.95 | 0.50 | 0 50 |
| 22 | 0.975 | 0.025 | 0.950 | 0.050 | 0.00 | 1.00 | 0.50 | 0.50 |
| 23 | 0.975 | 0.025 | 0.800 | 0.200 | 0.90 | 0.10 | 0.50 | 0.50 |
| 24 | 0.975 | 0.025 | 0.800 | 0.200 | 0.80 | 0.20 | 0.50 | 0.50 |
| 25 | 0.975 | 0.025 | 0.800 | 0.200 | 0.50 | 0.50 | 0.50 | 0.50 |
| 26 | 0.975 | 0.025 | 0.800 | 0.200 | 0.20 | 0.80 | 0.50 | 0.50 |
| 27 | 0.975 | 0.025 | 0.800 | 0.200 | 0.05 | 0.95 | 0.50 | 0.50 |
| 28 | 0.975 | 0.025 | 0.650 | 0.350 | 0.90 | 0.10 | 0.50 | 0.50 |
| 29 | 0.975 | 0.025 | 0.650 | 0.350 | 0.50 | 0.50 | 0.50 | 0.50 |
| 30 | 0.975 | 0.025 | 0.650 | 0.350 | 0.35 | 0.65 | 0.50 | 0.50 |
| 31 | 0.975 | 0.025 | 0.650 | 0.350 | 0.20 | 0.80 | 0.50 | 0.50 |
| 32 | 0.975 | 0.025 | 0.500 | 0.500 | 0.90 | 0.10 | 0.50 | 0.50 |
| 33 | 0.975 | 0.025 | 0.500 | 0.500 | 0.50 | 0.50 | 0.50 | 0.50 |
| 34 | 0.975 | 0.025 | 0.500 | 0.500 | 0.35 | 0.65 | 0.50 | 0.50 |

TABLE 4

Ni-MLCC Proto-Type SPL Properties
(Dielectric Constant/DF Measurement Condition: AC 0.2 V/μm, 1 kHz)
(Room Temperature Specific Resistance: DC 10 V/μm)

| Experimental Example | Firing Temperature (° C.) | Room Temperature Dielectric Constant | DF (%) | Room Temperature Specific Resistance (ohm-cm) | TCC (%) (−55° C.) | TCC (%) (125° C.) | TCC (%) (150° C.) | High Temperature (150° C.) Withstand Voltage (V/μm)* | Evaluation |
|---|---|---|---|---|---|---|---|---|---|
| 18 | 1250.0 | 2320.0 | 4.180 | 4.759E+12 | −14.60% | −4.50% | −14.80% | 60 | Δ |
| 19 | 1250.0 | 2315.0 | 4.785 | 9.980E+12 | −13.40% | −10.50% | −14.40% | 60 | ○ |
| 20 | 1250.0 | 2302.0 | 4.940 | 8.870E+12 | −13.80% | −10.10% | −13.50% | 60 | ○ |
| 21 | 1250.0 | 2147.0 | 5.660 | 3.650E+12 | −14.10% | −7.11% | −12.60% | 50 | Δ |
| 22 | 1250.0 | 2046.0 | 5.740 | 9.640E+11 | −14.30% | −4.30% | −8.40% | 45 | X |
| 23 | 1250.0 | 2622.0 | 4.730 | 9.810E+11 | −12.50% | −10.40% | −14.50% | 70 | ○ |
| 24 | 1250.0 | 2517.0 | 5.230 | 6.450E+12 | −13.10% | −8.10% | −12.20% | 65 | ○ |
| 25 | 1250.0 | 2388.0 | 5.640 | 4.450E+12 | −14.20% | −6.70% | −11.00% | 60 | ○ |
| 26 | 1250.0 | 2297.0 | 6.120 | 3.880E+12 | −10.70% | −5.10% | −14.10% | 50 | Δ |
| 27 | 1250.0 | 2506.0 | 7.330 | 9.773E+11 | −9.50% | −6.20% | −14.20% | 40 | X |
| 28 | 1250.0 | 2634.0 | 3.880 | 8.850E+12 | −11.70% | −9.80% | −13.50% | 65 | ○ |
| 29 | 1250.0 | 2312.0 | 7.540 | 7.270E+12 | −10.20% | −9.40% | −12.80% | 60 | ○ |
| 30 | 1250.0 | 2236.0 | 7.680 | 8.630E+11 | −11.50% | −6.80% | −11.20% | 50 | Δ |
| 31 | 1250.0 | 2084.0 | 8.440 | 6.321E+11 | −8.70% | −5.40% | −11.10% | 40 | X |
| 32 | 1250.0 | 2431.0 | 4.570 | 4.580E+12 | −12.60% | −8.50% | −12.50% | 60 | ○ |
| 33 | 1250.0 | 1984.0 | 7.330 | 1.650E+11 | −14.50% | −6.20% | −9.80% | 50 | Δ |
| 34 | 1250.0 | 1778.0 | 9.270 | 4.650E+10 | −14.70% | −2.80% | −5.70% | 25 | X |

Table 3 shows compositions of Experimental Examples in which a content of $Bi(Mg_{0.5}Ti_{0.5})O_3$ of the first powder, x, satisfied x=0.025, depending on a content of $Bi(Mg_{0.5}Ti_{0.5})O_3$ in the second powder, y, and a content of the second powder, a, when the first accessory component $MnO_2$ and the second accessory component $SiO_2$ were contained in contents of 0.5 mol % and 0.5 mol %, respectively, based on 100 mol % of the base powder $(1-a)[(1-x)BaTiO_3+xBi(Mg_{0.5}Ti_{0.5})O_3]+a[(1-y)BaTiO_3+yBi(Mg_{0.5}Ti_{0.5})O_3]$. Table 4 shows properties of prototype chips corresponding to the Experimental Examples of Table 3 above.

When x=0.025, even in a case in which a=0 (Experimental Example 18), TCC at 150° C. was −14.8% and satisfied X8R standard.

It could be appreciated that in a case in which a value was increased under the condition that y value was fixed (Experimental Examples 18 to 34), TCC at 150° C. was increased, and a high temperature withstand voltage was decreased.

In addition, as y was increased, a value, the content of the second powder deteriorating the high temperature withstand voltage was also decreased.

That is, it could be appreciated that when the y values were 0.05 (Experimental Example 21), 0.2 (Experimental Example 26), 0.35 (Experimental Example 30) and 0.5 (Experimental Example 33), maximum values of the content of the second powder, a, at which 50 V/μm or more of high temperature withstand voltage properties could be implemented, were 0.95, 0.8, 0.65 and 0.5, respectively.

Referring to Tables 3 and 4 above, it could be appreciated that Experimental Examples 22, 27, 31 and 34 had problems in the evaluation of X8R(−55 C to 150° C.) temperature characteristics, temperature coefficient of capacitance (TCC) characteristics, and high temperature withstand voltage properties.

From Experimental Examples of Tables 1 to 4 above and results thereof, when the first accessory component $MnO_2$ and the second accessory component $SiO_2$ have contents of 0.5 mol % and 0.5 mol %, respectively, based on 100 mol % of the base powder $(1-a)[(1-x)BaTiO_3+xBi(Mg_{0.5}Ti_{0.5})O_3]+a[(1-y)BaTiO_3+yBi(Mg_{0.5}Ti_{0.5})O_3]$, the content of $Bi(Mg0.5Ti0.5)O3$ in the first powder, x, has a range of $0 \le x \le 0.05$, the content of $Bi(Mg0.5Ti0.5)O3$ in the second powder, y, has a range of $0.05 \le y \le 0.5$, and the content of the second powder, a, has a range of a 0, and $0.01-x \le a \le 1-y$ is satisfied, in the composition of the base powder having excellent TCC at 150° C. and high temperature withstand voltage properties.

TABLE 5

| | First Powder Molar Ratio of Each Component of First Powder $(1 - x)BaTiO_3 + xBi(Mg0.5Ti0.5)O_3$ | | Second Powder Molar Ratio of Each Component of Second Powder $(1 - y)BaTiO_3 + yBi(Mg0.5Ti0.5)O_3$ | | Mixing Molar Ratio of First Powder vs Second Powder $(1 - a)[(1 - x)BaTiO_3 + xBi(Mg0.5Ti0.5)O_3] + a([1 - y)BaTiO_3 + yBi(Mg0.5Ti0.5)O_3]$ | | Additive (Accessory Component) Number of Moles of Each Additive Per 100 mol of Base Metal Powder | |
|---|---|---|---|---|---|---|---|---|
| EXPERIMENTAL EXAMPLE | First Main Component (1 − x) | Second Main Component x | First Main Component (1 − y) | Second Main Component y | First Powder (1 − a) | Second Powder a | First Accessory Component MnO2 | Second Accessory Component SiO2 |
| 35 | 1.000 | 0.000 | 0.800 | 0.200 | 0.80 | 0.20 | 0.00 | 0.50 |
| 36 | 1.000 | 0.000 | 0.800 | 0.200 | 0.80 | 0.20 | 0.10 | 0.50 |
| 37 | 1.000 | 0.000 | 0.800 | 0.200 | 0.80 | 0.20 | 0.30 | 0.50 |
| 38 | 1.000 | 0.000 | 0.800 | 0.200 | 0.80 | 0.20 | 1.00 | 0.50 |
| 39 | 1.000 | 0.000 | 0.800 | 0.200 | 0.80 | 0.80 | 2.00 | 0.50 |
| 40 | 1.000 | 0.000 | 0.800 | 0.200 | 0.80 | 0.20 | 3.00 | 0.50 |
| 41 | 1.000 | 0.000 | 0.800 | 0.200 | 0.80 | 0.20 | 5.00 | 0.50 |
| 42 | 1.000 | 0.000 | 0.800 | 0.200 | 0.80 | 0.20 | 0.50 | 0.00 |
| 43 | 1.000 | 0.000 | 0.800 | 0.200 | 0.80 | 0.20 | 0.50 | 0.10 |
| 44 | 1.000 | 0.000 | 0.800 | 0.200 | 0.80 | 0.20 | 0.50 | 1.00 |
| 45 | 1.000 | 0.000 | 0.800 | 0.200 | 0.80 | 0.20 | 0.50 | 2.00 |
| 46 | 1.000 | 0.000 | 0.800 | 0.200 | 0.80 | 0.20 | 0.50 | 3.00 |
| 47 | 1.000 | 0.000 | 0.800 | 0.200 | 0.80 | 0.20 | 0.00 | 5.00 |

TABLE 6

Ni-MLCC Proto-Type SPL Properties
(Dielectric Constant/DF Measurement Condition: AC 0.2 V/μm, 1 kHz)
(Room Temperature Specific Resistance: DC 10 V/μm)

| Experimental Example | Firing Temperature (° C.) | Room Temperature Dielectric Constant | DF (%) | Room Temperature Specific Resistance (ohm-cm) | TCC (%) (−55° C.) | TCC (%) (125° C.) | TCC (%) (150° C.) | High Temperature (150° C.) Withstand Voltage (V/μm)* | Evaluation |
|---|---|---|---|---|---|---|---|---|---|
| 35 | 1250.0 | 2750.4 | 14.175 | 4.112E+06 | −11.10% | −4.10% | −11.60% | 5 | X |
| 36 | 1250.0 | 2558.9 | 6.053 | 5.973E+11 | −13.50% | −3.90% | −12.10% | 50 | Δ |
| 37 | 1250.0 | 2335.0 | 4.943 | 2.502E+12 | −13.80% | −3.80% | −9.80% | 50 | ○ |
| 38 | 1250.0 | 1865.6 | 2.603 | 7.643E+12 | −12.40% | −2.20% | −8.50% | 70 | ○ |
| 39 | 1250.0 | 1546.3 | 2.463 | 5.765E+11 | −11.20% | −2.10% | −8.10% | 70 | ○ |
| 40 | 1250.0 | 1360.4 | 2.277 | 2.166E+11 | −10.80% | −1.40% | −7.80% | 85 | ○ |
| 41 | 1250.0 | 1253.0 | 2.104 | 8.561E+10 | −10.00% | −1.60% | −7.40% | 55 | Δ |
| 42 | 1290.0 | 2299.9 | 4.309 | 5.233E+12 | −12.50% | −2.80% | −9.60% | 55 | Δ |

TABLE 6-continued

Ni-MLCC Proto-Type SPL Properties
(Dielectric Constant/DF Measurement Condition: AC 0.2 V/μm, 1 kHz)
(Room Temperature Specific Resistance: DC 10 V/μm)

| Experimental Example | Firing Temperature (° C.) | Room Temperature Dielectric Constant | DF (%) | Room Temperature Specific Resistance (ohm-cm) | TCC (%) (−55° C.) | TCC (%) (125° C.) | TCC (%) (150° C.) | High Temperature (150° C.) Withstand Voltage (V/μm)* | Evaluation |
|---|---|---|---|---|---|---|---|---|---|
| 43 | 1270.0 | 2266.0 | 4.087 | 5.959E+12 | −12.70% | −3.40% | −8.70% | 55 | ○ |
| 44 | 1240.0 | 2173.1 | 3.858 | 6.963E+12 | −12.10% | −2.10% | −8.50% | 70 | ○ |
| 45 | 1250.0 | 2100.6 | 3.728 | 6.087E+12 | −11.40% | −1.80% | −8.10% | 60 | ○ |
| 46 | 1270.0 | 1987.9 | 3.424 | 4.991E+12 | −11.40% | −1.70% | −7.80% | 80 | ○ |
| 47 | 1290.0 | 1796.6 | 3.157 | 4.046E+12 | −9.80% | −1.40% | −7.20% | 50 | Δ |

Ni-MLCC Proto-Type SPL Properties
(Dielectric Constant/DF Measurement Condition: AC 0.2 V/μm, 1 kHz)
(Room Temperature Specific Resistance: DC 10 V/μm)

| Experimental Example | Firing Temperature (° C.) | Room Temperature Dielectric Constant | DF (%) | Room Temperature Specific Resistance (ohm-cm) | TCC (%) (−55° C.) | TCC (%) (125° C.) | TCC (%) (150° C.) | High Temperature (150° C.) Withstand Voltage (V/μm)* | Evaluation |
|---|---|---|---|---|---|---|---|---|---|
| 41 | 1250.0 | 2750.4 | 14.175 | 4.112E+06 | −11.10% | −4.10% | −11.60% | 5 | X |
| 42 | 1250.0 | 2558.9 | 6.053 | 5.973E+11 | −13.50% | −3.90% | −12.10% | 50 | Δ |
| 43 | 1250.0 | 2335.0 | 4.943 | 2.502E+12 | −13.80% | −3.60% | −9.80% | 50 | ○ |
| 44 | 1250.0 | 1865.6 | 2.603 | 7 643E+12 | −12.40% | −2.20% | −8.50% | 70 | ○ |
| 45 | 1250.0 | 1546.3 | 2.463 | 5.765E+11 | −11.20% | −2.10% | −8.10% | 70 | ○ |
| 46 | 1250.0 | 1360.4 | 2.277 | 2.166E+11 | −10.80% | −1.40% | −7.80% | 65 | ○ |
| 47 | 1250.0 | 1253.0 | 2.104 | 8.561E+10 | −10.00% | −1.60% | −7.40% | 55 | Δ |
| 48 | 1290.0 | 2299.9 | 4.309 | 5.233E+12 | −12.50% | −2.80% | −9.60% | 55 | Δ |
| 49 | 1270.0 | 2266.0 | 4.087 | 5.959E+12 | −12.70% | −3.40% | −8.70% | 55 | ○ |
| 50 | 1240.0 | 2173.1 | 3.858 | 6.963E+12 | −12.10% | −2.10% | −8.50% | 70 | ○ |
| 51 | 1250.0 | 2100.6 | 3.728 | 6.087E+12 | −11.40% | −1.80% | −8.10% | 60 | ○ |
| 52 | 1270.0 | 1987.9 | 3.424 | 4.991E+12 | −11.40% | −1.70% | −7.80% | 60 | ○ |
| 53 | 1290.0 | 1796.6 | 3.157 | 4.046E+12 | −9.80% | −1.40% | −7.20% | 50 | Δ |

Experimental Examples 35 to 41 of Table 5 show compositions of Experimental Examples depending on a change in a content of the first accessory component $MnO_2$ when a content of $Bi(Mg_{0.5}Ti_{0.5})O_3$ in the first powder, x, satisfied x=0, a content of $Bi(Mg_{0.5}Ti_{0.5})O_3$ in the second powder, y, satisfied y=0.2, a content of the second powder, a, satisfied a=0.2, and a content of the second accessory component $SiO_2$ was 0.5 mol based on the base powder, in the base powder represented by $(1-a)[(1-x)BaTiO_3+xBi(Mg_{0.5}Ti_{0.5})O_3]+a[(1-y)BaTiO_3-yBi(Mg_{0.5}Ti_{0.5})O_3]$. Table 6 shows properties of prototype chips corresponding to the Experimental Examples.

It could be appreciated that when Mn had a content of 0 (Comparative Example 35 and Experimental Example 35), the room temperature specific resistance value was significantly low as 4.112E+06, and when Mn had a content of 0.1 (Experimental Example 36) or more, insulation characteristics of 1.000E+10 or more were implemented.

As the content of Mn was increased, the dielectric constant was continuously decreased, and thus, when Mn had a content of 0.05 mol % (Experimental Example 41), the dielectric constant thereof was 1253, and the high temperature withstand voltage properties could be slightly deteriorated.

Therefore, in consideration of the dielectric constant, the high temperature withstand voltage, TCC characteristics, from results of Experimental Examples 41 to 47, it could be confirmed that the Mn content may be preferably selected to be within a range of 0.1 to 5 mol % when the content of $Bi(Mg_{0.5}Ti_{0.5})O_3$ in the first powder, x, satisfied x=0, the content of $Bi(Mg_{0.5}Ti_{0.5})O_3$ in the second powder, y, satisfied y=0.2, the content of the second powder, a, satisfied a=0.2, and the content of the second accessory component $SiO_2$ was 0.5 mol based on the base powder.

Experimental Examples 42 to 47 of Table 5 show compositions of Experimental Examples depending on a change in a content of the second accessory component $SiO_2$ when the content of $Bi(Mg_{0.5}Ti_{0.5})O_3$ in the first powder, x, satisfied x=0, the content of $Bi(Mg_{0.5}Ti_{0.5})O_3$ in the second powder, y, satisfied y=0.2, the content of the second powder, a, satisfied a=0.2, and the content of the first accessory component $MnO_2$ was 0.5 mol based on the base powder, in the base powder represented by $(1-a)[(1-x)BaTiO_3+xBi(Mg_{0.5}Ti_{0.5})O_3]+a[(1-y)BaTiO_3-yBi(Mg_{0.5}Ti_{0.5})O_3]$, and Table 6 shows properties of prototype chips corresponding to the Experimental Examples.

When $SiO_2$ had a content of 0 (Comparative Example 48 and Experimental Example 42), the sintering temperature was increased to a temperature of about 1290° C., while in the Samples to which $SiO_2$ was added (Experimental Examples 43 to 46), sinterability was improved.

In a case in which $SiO_2$ is contained in an excessive content of 5 mol % (Comparative Example 47 and Experimental Example 47), an improvement in sinterability was rarely exhibited, and the dielectric constant and the high temperature withstand voltage characteristics could be deteriorated.

Therefore, it could be appreciated from results of Experimental Example 42 to 47 that the content of $SiO_2$ was preferably selected to be within a range of 0.1 to 5 mol % in consideration of the dielectric constant, the high temperature withstand voltage characteristics, and TCC properties, and the sinterability.

As set forth above, according to exemplary embodiments of the present disclosure, due to an increase in Curie temperature of a base powder and an uniform dielectric constant of a high temperature part, the dielectric ceramic composition capable of satisfying X8R temperature characteristics and having excellent high temperature withstand voltage properties, and the multilayer ceramic capacitor containing the same, may be provided.

While exemplary embodiments have been shown and described above, it will be apparent to those skilled in the art that modifications and variations could be made without departing from the spirit and scope of the present disclosure as defined by the appended claims.

What is claimed is:

1. A dielectric ceramic composition comprising: a base powder represented by $(1-a)[(1-x)BaTiO_3-xBi(Mg_{0.5}Ti_{0.5})O_3]+a[(1-y)BaTiO_3-yBi(Mg_{0.5}Ti_{0.5})O_3]$ (wherein x, y, and a satisfy $0 \leq x \leq 0.05$, $0.05 \leq y \leq 0.5$, $a \geq 0$, and $0.01-x \leq a \leq 1-y$) and including a first powder represented by $[(1-x)BaTiO_3-xBi(Mg_{0.5}Ti_{0.5})O_3]$ and a second powder represented by $[(1-y)BaTiO_3-yBi(Mg_{0.5}Ti_{0.5})O_3]$, each of the first powder and the second powder containing a first main component represented by $BaTiO_3$ and a second main component represented by $Bi(Mg_{0.5}Ti_{0.5})O_3$, but at different ratios.

2. The dielectric ceramic composition of claim 1, wherein the first main component and the second main component are solid-solubilized.

3. The dielectric ceramic composition of claim 1, further comprising: 0.1 to 5.0 mol % of a first accessory component, an oxide or a carbonate containing at least one of Mn, V, Cr, Fe, Ni, Co, Cu and Zn, based on 100 mol % of the base powder.

4. The dielectric ceramic composition of claim 1, further comprising: 0.1 to 5.0 mol % of a second accessory component, an oxide containing Si, based on 100 mol % of the base powder.

5. The dielectric ceramic composition of claim 1, further comprising: 0.1 to 5.0 mol % of a second accessory component, a glass compound containing Si, based on 100 mol % of the base powder.

6. A multilayer ceramic capacitor comprising:
a ceramic body in which dielectric layers and first and second internal electrodes are alternately stacked; and
first and second external electrodes disposed on both end portions of the ceramic body and electrically connected to the first and second internal electrodes, respectively,
wherein the dielectric layers contain a dielectric ceramic composition containing a base powder represented by $(1-a)[(1-x)BaTiO_3-xBi(Mg_{0.5}Ti_{0.5})O_3]+a[(1-y)BaTiO_3-yBi(Mg_{0.5}Ti_{0.5})O_3]$ (wherein x, y, and a satisfy $0 \leq x \leq 0.05$, $0.05 \leq y \leq 0.5$, $a \geq 0$, and $0.01-x \leq a \leq 1-y$) and including a first powder represented by $[(1-x)BaTiO_3-xBi(Mg_{0.5}Ti_{0.5})O_3]$ and a second powder represented by $[(1-y)BaTiO_3-yBi(Mg_{0.5}Ti_{0.5})O_3]$, each of the first powder and the second powder containing a first main component represented by $BaTiO_3$ and a second main component represented by $Bi(Mg_{0.5}Ti_{0.5})O_3$, but at different ratios.

7. The multilayer ceramic capacitor of claim 6, wherein the first main component and the second main component are solid-solubilized.

8. The multilayer ceramic capacitor of claim 6, wherein the dielectric ceramic composition further contains 0.1 to 5.0 mol % of a first accessory component, an oxide or a carbonate containing at least one of Mn, V, Cr, Fe, Ni, Co, Cu and Zn, based on 100 mol % of the base powder.

9. The multilayer ceramic capacitor of claim 6, wherein the dielectric ceramic composition further contains 0.1 to 5.0 mol % of a second accessory component, an oxide containing Si, based on 100 mol % of the base powder.

10. The multilayer ceramic capacitor of claim 6, wherein the dielectric ceramic composition further contains 0.1 to 5.0 mol % of a second accessory component, a glass compound containing Si, based on 100 mol % of the base powder.

* * * * *